US006650791B1

(12) United States Patent
Cullen

(10) Patent No.: US 6,650,791 B1
(45) Date of Patent: *Nov. 18, 2003

(54) SIMULTANEOUS REGISTRATION OF MULTIPLE IMAGE FRAGMENTS

(75) Inventor: John Cullen, Redwood City, CA (US)

(73) Assignee: Ricoh Company Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/214,426

(22) Filed: Aug. 7, 2002

Related U.S. Application Data

(60) Continuation of application No. 09/450,652, filed on Jan. 20, 1999, now Pat. No. 6,459,821, which is a division of application No. 08/527,826, filed on Sep. 13, 1995, now Pat. No. 6,038,349.

(51) Int. Cl.[7] ................................................. G06K 9/32
(52) U.S. Cl. ....................... 382/294; 382/151; 382/173; 382/284; 382/287; 345/178; 348/95; 358/406
(58) Field of Search .................................. 382/151, 173, 382/175, 181, 209, 218, 220, 224, 275, 284, 287, 289, 294–296, 309, 310; 345/178, 629; 348/95; 358/406, 448, 450

(56) References Cited

U.S. PATENT DOCUMENTS

| 4,170,418 A | 10/1979 | Aiuchi et al. ................ 356/400 |
| 4,941,164 A | 7/1990 | Schuller et al. .............. 378/205 |
| 5,140,647 A | 8/1992 | Ise et al. ....................... 386/284 |
| 5,963,664 A | 10/1999 | Kumar et al. ................ 382/154 |

FOREIGN PATENT DOCUMENTS

| EP | 0 598 408 A2 | 5/1994 |
| GB | 2 293 734 A | 4/1996 |
| GB | 2 295 936 A | 6/1996 |
| JP | 7-115534 | 10/1993 |
| WO | WO 91/03902 | 3/1991 |
| WO | WO 93/12501 | 6/1993 |

OTHER PUBLICATIONS

Barnea, D.I. et al., "A class of Algorithms for Fast Digital Image Registration", *IEEE Transactions on Computers*, vol. C–21, No. 2, pp. 179–186, Feb. 1972.
Brown, L.G., "A Survey of Image Registration Techniques", *ACM Computing Surveys*, vol. 24, No. 4, pp. 333–376, Dec. 1992.
Kirpatrick, S. et al., "Optimization by Simulated Annealing", *Science*, vol. 220, No. 4598, pp. 671–680, May 13, 1983.
Tanaka, M. et al., "Picture Assembly Using a Hierarchical Partial–Matching Technique", *IEEE Transactions On Systems, Man, and Cybernetics*, vol. SMC–8, No. 11, pp. 812–819, Nov. 1978.
Wong, et al., "Sequential Hierarchical Scene Matching", *IEEE Transactions on Computers*, vol. C–27, No. 4, pp. 359–366, 1978.
Yan, Lu. "Interest Operators and Fast Implementation" *International Archive of Photogrammetry and Remote Sensing*, vol. 27–II, Japan, pp. 491–500, 1988.
Zhengyou, Z., "Iterative Point Matching for Registration of Free–Form Curves and Surfaces", *International Journal of Computer Vision*, vol. 13, No. 2, pp. 119–151, 1994.

Primary Examiner—Daniel G. Mariam
(74) Attorney, Agent, or Firm—Townsend, Townsend & Crew LLP

(57) ABSTRACT

Method and apparatus for aligning more than two fragments of an image to assemble the image while providing high alignment quality between each pair of overlapping image fragments. Image registration operations are performed rapidly. The disclosed method and apparatus finds application in, for example, scanning, copying, and facsimile transmission of large format documents.

34 Claims, 16 Drawing Sheets

BT for about $9.7 billion.
(Article on Page A3)

* * *

Hicks Muse backed out of an $860
ion deal to buy Pearson's busi-
s-publishing unit, saddling Pear-
with unexpected debt during a
sitive financial restructuring.
(Article on Page A2)

* * *

BellSouth declared a 2-for-1 stock
t, boosted its dividend and an-
nced plans to buy back as much as
illion of its common shares.
(Article on Page B6)

* * *

The number of checks Americans
te has climbed in recent years,
ner than falling as expected.
(Article on Page A2)

* * *

Patriot American said in an SEC
ig that it won't pay a third-quarter
.dend, the latest sign of a cash
rtage. The REIT also disclosed it is
alks to sell additional hotels.
(Article on Page A4)

* * *

AlliedSignal's CEO said his com-
y won't try to top Tyco Interna-
ial's $11.3 billion offer for AMP.
(Article on Page B4)

* * *

Fleet's CEO said he is looking for
uisitions that would add assets of
ween $50 billion and $100 billion to
bank and keep it independent.
(Article on Page A24)

* * *

Lowe's Cos.' agreement to acquire
rle Hardware in a stock swap val-
: at about $1 billion accelerates its
bitious expansion into the West.
(Article on Page A24)

* * *

Siebe and BTR of the U.K. agreed
. merger that will create a leader in
controls and automation industry.
(Article on Page A19)

* * *

CMAC agreed to acquire Amerin
a stock swap valued at $646.7 mil-
l, creating the second-largest U.S.
ter of mortgage insurance.

* * *

The Palestinian authority will open an
airport in the Gaza Strip today with a flight
from Egypt. The $70 million facility was
approved in the 1994 Oslo accord, but re-
mained closed because of Israeli security
concerns. The recent U.S.-brokered accord
cleared it to open. (Article on Page A19)

* * *

The EU ban on British beef is likely to be
lifted next year for boneless meat after 10 of
15 nations agreed London had taken appro-
priate steps to combat "mad cow" disease.
Britain has killed 2.66 million cows since the
ban was imposed two years ago. Thirty
people have died of the new disease strain.

* * *

South Africa's economy shrank at an
annual rate of 2.3% in the third quarter, its
worst performance in more than four years,
raising concern ahead of spring elections.
Mandela's designated heir, Thabo Mbeki,
was in Russia, where he rejected a bid for a
defense contract. (Article on Page A19)

* * *

Clinton paid a five-hour visit to Guam on
the way back from his Asia trip, and, while
vowing closer ties, said islanders must de-
cide any expansion of the territory's politi-
cal status. Meanwhile, Defense Secretary
Cohen reaffirmed U.S. peacekeeping strat-
egy of maintaining 100,000 troops in Asia.

* * *

Turkey's parliament began debate on a
no-confidence motion expected to lead to
Prime Minister Yilmaz's ouster tomorrow.
Meanwhile, Turkey has stopped broadcast-
ing Italian TV after Rome refused to hand
over Kurdish rebel chief Abdullah Ocalan.

* * *

The death toll in Indonesia rose to 14 as
police pulled eight bodies from a gambling
hall burned in weekend clashes between
Christians and Muslims in Jakarta. Presi-
dent Habibie and Muslim leaders said un-
rest was instigated by unspecified people.

* * *

Congo's government claimed warplanes
flown by its Zimbabwean allies bombed and
sank six boatloads of rebels on Lake Tan-
ganyika, killing hundreds. Rebel officials
had no comment, and there was no indepen-
dent confirmation of the weekend attack.

* * *

A cold snap in Europe has killed at least
65 people since last week. Most of the deaths
were in Poland, Romania and Bulgaria, and
police said the majority of those killed were
either homeless or had fallen asleep outside
in the subzero temperatures after drinking.

* * * medical magazines.
Dr. Marusic quickl
where JAMA runs su
from other publicatio
Croatian Medical Jou
times since 1994. For I
periences equal that ·
and seeing a precis of
"It's one of the b
Marusic says as he sc:
But this issue of JAI
summaries culled from
tions, has nothing fro
ical Journal. "We are
says. "We would like t
Dr. Marusic is a 52-
specialist who spends I
and conducting resear
versity School of Medi
ing the journal. He sta
prove that researcher
something to contrib
used to belong to Yuf
4.8 million people and
tion dating back to th
Croatians say they pi
But decades of commu
it difficult to conduct p
Dr. Marusic also
by encouraging rese
can help Croatia evol
veloped Balkan minis
country like nearby It
That is more impo
own research. It's a
than earning big mo
tice. "Money is very b
says. "It's worse than
Getting a mention
to show that his 2,00

*Ana and Mai*
has made it. Beyond t
really wants to be in
called Current Conte

1110 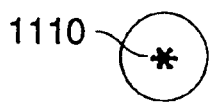
FIG. 11D
1112 
FIG. 11E
1114 — · Rome refuse(
chief Abdullah
\* \*
Indonesia ros
bodies from a
akand clashes
FIG. 11F
1116 — al restructuri
on Page A2)
\* \*
clared a 2-foi
ts dividend
FIG. 11G

1114

1116 r for about $9.7 billion.
(Article on Page A3)

* * *

:ks Muse backed out of an $860 n deal to buy Pearson's busi-ublishing unit, saddling Pear-/ith unexpected debt during a ive financial restructuring.

1126 —(Article on Page A2)

* * *

:iSouth declared a 2-for-1 stock boosted its dividend and an-:ed plans to buy back as much as lion of its common shares.
(Article on Page B4)

* * * ie number of checks Americans has climbed in recent years, r than falling as expected.
(Article on Page A2)

* * * atriot American said in an SEC ; that it won't pay a third-quarter end, the latest sign of a cash :age. The REIT also disclosed it is lks to sell additional hotels.
(Article on Page A4)

* * * lliedSignal's CEO said his com-' won't try to top Tyco Interna-il's $11.3 billion offer for AMP.
(Article on Page B4)

* * * leet's CEO said he is looking for iisitions that would add assets of /een $50 billion and $100 billion to 3ank and keep it independent.
(Article on Page A24)

* * *

.owe's Cos.' agreement to acquire le Hardware in a stock swap val-at about $1 billion accelerates its iitious expansion into the West.
(Article on Page A24)

* * *

5iebe and BTR of the U.K. agreed merger that will create a leader in controls and automation industry.
(Article on Page A19)

* * *

CMAC agreed to acquire Amerin i stock swap valued at $646.7 mil-i, creating the second-largest U.S. ter of mortgage insurance.

* * *

The Palestinian authority will open an airport in the Gaza Strip today with a flight from Egypt. The $70 million facility was approved in the 1994 Oslo accord, but remained closed because of Israeli security concerns. The recent U.S.-brokered accord cleared it to open. (Article on Page A19)

* * *

The EU ban on British beef is likely to be lifted next year for boneless meat after 10 of 15 nations agreed London had taken appropriate steps to combat "mad cow" disease. Britain has killed 2.66 million cows since the ban was imposed two years ago. Thirty people have died of the new disease strain.

* * *

South Africa's economy shrank at an annual rate of 2.3% in the third quarter, its worst performance in more than four years, raising concern ahead of spring elections. Mandela's designated heir, Thabo Mbeki, was in Russia, where he rejected a bid for a defense contract. (Article on Page A19)

* * *

Clinton paid a five-hour visit to Guam on the way back from his Asia trip, and, while vowing closer ties, said islanders must decide any expansion of the territory's political status. Meanwhile, Defense Secretary Cohen reaffirmed U.S. peacekeeping strategy of maintaining 100,000 troops in Asia.

* * *

Turkey's parliament began debate on a no-confidence motion expected to lead to Prime Minister Yilmaz's ouster tomorrow. Meanwhile, Turkey has stopped broadcasting Italian TV after Rome refused to hand over Kurdish rebel chief Abdullah Ocalan.

* * *

The death toll in Indonesia rose to 14 as police pulled eight bodies from a gambling hall burned in weekend clashes between Christians and Muslims in Jakarta. President Habibie and Muslim leaders said unrest was instigated by unspecified people.

* * *

Congo's government claimed warplanes flown by its Zimbabwean allies bombed and sank six boatloads of rebels on Lake Tanganyika, killing hundreds. Rebel officials had no comment, and there was no independent confirmation of the weekend attack.

1118 — * * — 1120

A cold snap in Europe has killed at least 65 people since last week. Most of the deaths were in Poland, Romania and Bulgaria, and police said the majority of those killed were either homeless or had fallen asleep outside in the subzero temperatures after drinking.

SIMULTANEOUS REGISTRATION OF MULTIPLE IMAGE FRAGMENTS

CROSS REFERENCE TO RELATED APPLICATION

This application is a continuation of U.S. patent application Ser. No. 09/450,652, filed Jan. 20, 1999, (which is now U.S. Pat. No. 6,459,821 issued Oct. 1, 2002) which is a divisional of U.S. patent application Ser. No. 08/527,826, filed on Sep. 13, 1995, (which is now U.S. Pat. No. 6,038,349 issued Mar. 14, 2002) which are both incorporated herein by reference.

SOURCE CODE APPENDIX

A microfiche appendix of "C" source code for a preferred embodiment are filed herewith. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to joining of fragments of an image to assemble the complete image, and particularly to accurately joining multiple image fragments.

Today, image processing devices allow images to be "captured" by computer systems by, e.g., scanning an image to obtain a digital representation of the image. Also, digital representations of images can be printed to generate a hard copy of the image. Examples of image processing devices are copiers, fax machines and scanners. These systems now use advanced technology to allow a human operator to manipulate the captured image by reducing, enlarging, adjusting the contrast, resolution or color of images, etc. While today's basic image processing devices are well-suited to handling standard size images, such as an image on an 8.5"×11" sheet of paper, problems arise in these devices where an oversize image needs to be broken into image fragments in order to capture the image into a device and the fragments need to be reassembled for printing or other further processing.

For example, a problem with copy machines arises when it is desired to copy an oversize image, such as a map or poster. This is because the configuration of the copy machine will usually allow only portions, or fragments, of the oversize image to be scanned in each pass of the copier's scanning mechanism. This means that the human user of the copier needs to manually position the oversize image and make multiple scans of portions of the map or poster. Because the user must visually align the oversize image on the copier's platen, often without the aid of any registration marks, the user ends up with a hodgepodge collection of non-uniform fragments of the oversize image spread out over the papers. In the worst case, the user must then manually assemble the image fragments by cropping and taping together the pages.

Similarly, fax machines are limited to accepting paper of fixed and relatively small dimensions. If an oversize document is wider than that allowable by the fax machine, the document must be broken up into smaller images on smaller sheets of paper. The oversize image is then transmitted as several pieces to a receiving fax machine. A user at the receiving fax machine then goes through a similar process to piece together the oversize document's image from the multiple fragments of the document.

The process of automatically aligning image fragments to reproduce an original image is known as image registration. Some prior art image registration techniques were primarily developed for applications in the remote sensing field, e.g. constructing a composite satellite image of a large area from multiple photographs taken at different satellite positions.

These techniques, however, cannot be effectively applied to the office copier environment. On the one hand, long response times cannot be tolerated in copier applications. On the other hand, image registration techniques used in remote sensing must not only translate and rotate image fragments relative one another to align them, but must also correct for nonlinear effects, aspect, scale, changing contrast, and other effects.

Image registration techniques developed for the office environment all suffer from one or more shortcomings. One technique relies on marks that must be specially applied to the original large format document. In accordance with another technique, a large format document is sequentially scanned in segments. Pairs of image fragments are then registered to one another in sequence.

This technique cannot provide professional quality in situations where more than two overlapping fragments are to be aligned. Consider the situation in FIG. 1 where 4 overlapping image fragments 2, 4, 6, and 8 have been aligned with one another in accordance with the prior art technique. Essentially, the prior art technique uses pairwise alignment to align image fragment 2 with image fragment 4, image fragment 4 with image fragment 6, and image fragment 6 with image fragment 8. The alignments of image fragment pairs 2 and 4, 4 and 6, and 6 and 8 are acceptable. However, the alignment between image fragment 2 and image fragment 8 is unacceptable. This is because imperceptible errors in the pairwise alignment accumulate to the point that the alignment error between image fragments 2 and 8 is perceptible. Since many applications will require more than two image fragments to be joined, this type of alignment error propagation over multiple fragments represents a serious shortcoming of the prior art.

SUMMARY OF THE INVENTION

In accordance with the present invention, more than two fragments of an image may be aligned to assemble the image while providing high alignment quality between each pair of overlapping image fragments. Image registration operations are performed rapidly. The present invention finds application in, for example, scanning, copying, and facsimile transmission of large format documents.

In accordance with a first aspect of the present invention, apparatus is provided for optimally joining more than two overlapping image fragments of a complete image to recover the complete image. The apparatus includes means for measuring an alignment error among at least two overlapping ones of the more than two image fragments in accordance with a first predetermined metric, means for refining an alignment between two selected overlapping image fragments of the two or more image fragments to reduce an alignment error between the two selected overlapping image fragments, means, coupled to the measuring means for accumulating a total alignment error between every possible overlapping pair of the more than two image fragments in accordance with the predetermined metric, global optimization means, coupled to the accumulating means and the refining means, for repeatedly applying the refining means to successive pairs of the overlapping image fragments to optimize the total alignment error.

In one embodiment of the present invention, a large format document or panoramic scene is captured as individual overlapping fragments by a scanner or other image capture device. A user then applies a user interface including a display and a pointing device to approximately align the image fragments on the display. One example of this kind of image fragment manipulation is described in U.S. patent application Ser. No. 08/446,196, (which is now U.S. Pat. No. 5,732,230 issued Mar. 24, 1998) assigned to the assignee of the present application, the contents of which are herein expressly incorporated by reference for all purposes.

Once the image fragments are brought by the user into approximate alignment, automatic image registration takes over. A list of overlapping image fragment pairs is constructed. The alignment of each pair of fragments is refined in turn. Within the scope of the present invention, any technique could be used to align each pair of image fragments. While individual pairs of fragments are being aligned, a total alignment error for all the pairs is monitored. New pairwise alignments that increase total error are rejected. When the total alignment error ceases to improve, the refinement process terminates.

This optimization process provided by the present invention thus assures that improvements in the alignment of one pair of image fragments do not come at the expense of the alignment of another pair of image fragments. Thus satisfactory registration quality is assured for all pairs of fragments.

The present invention further provides efficient techniques for refining the alignment of two overlapping image fragments. Generally, such techniques involve searching over a space of possible alignments for a best match. The present invention provides several techniques that may be applied to limit the search space and thus accelerate the refinement process.

One such technique provided by the present invention is a technique for first identifying template areas or interest points in a first image fragment to limit the search space for possible refined alignments. A grid of cells is overlaid over the first image fragment. An interest operator is applied to each pixel in the image to obtain an interest level for each pixel. For each cell having a pixel whose level that exceeds a predetermined threshold, the pixel with the greatest interest level in the cell is selected as a candidate interest point. Thus each cell has either one or zero candidate interest points. From the candidates, a first interest point is selected to be the candidate with the greatest interest level. A second interest point is selected to be the candidate interest point furthest away from the first interest point. Alternatively, some other number of interest points could be selected from the candidate interest points using similar criteria or other criteria.

The present invention further provides an enhanced technique for finding the interest level of each pixel. In accordance with this enhanced metric, the variance of pixel value is determined among pixels, a radius r pixels away along a vertical or horizontal axis, then calculated for pixels 2r pixels away and 3r pixels away. Three variances are thus obtained and the means of these three variances is determined to be the Moravec's variance for the pixel being evaluated. Of course, in accordance with the present invention, the number of variances used in the final determination could be different than three.

The present invention provides further techniques limiting the search space of possible refined alignments even after interest points have been identified in the first overlapping image fragment. For each interest point, the mean of a region surrounding each interest point in the first image fragment is evaluated. The region shape is selected so that the region's mean is invariant over rotations relative to the first image fragment and may, for example, be a circle or an annulus. For each interest point, this mean is used to limit the search space of possible translational alignments in the second image fragment. For each pixel in the second image fragment, the mean pixel value of a similarly structured region is evaluated. If the mean pixel value differs from the mean pixel value determined for the region surrounding the interest point by more than a threshold percentage, the translational alignment of the interest point to that pixel in the second image fragment can be discarded as a possible alignment. Because of the region shape, rotational alignments need not be checked separately at this stage. This aspect of the present invention greatly enhances the efficiency of refining the alignment of two overlapping image fragments.

In the preferred embodiment, initial evaluation of possible alignments of two overlapping image fragments is done substantially in accordance with the teaching of [Barnea72], the contents of which are herein expressly incorporated by reference for all purposes. Each interest point is aligned separately. The alignment errors of possible alignments are measured in accordance with a predetermined alignment error metric. In the preferred embodiment, the so-called L1 metric is used to determine alignment error. The error is calculated on a pixel-by-pixel basis between a region surrounding the interest point and a similarly sized region in the second image fragment. Once an accumulated error for a given alignment exceeds a threshold, calculations for that alignment may be terminated since there is little or no possibility of the alignment being ultimately selected as the refined alignment. The threshold may take into consideration the errors calculated for previous alignments and how far along the current alignment error evaluation is currently.

The result of the search through possible alignments is preferably a set of lists, with a list for each interest point, of alignments for which the measured error falls below a threshold. Each alignment may be represented as the location of the pixel in the second overlapping image fragment that lines up with the interest point.

In accordance with the invention, the refined alignment may be selected by taking into consideration the geometric relationship among the interest points located in the first image fragment. For a good alignment, the pixels in the second image fragment that align to the interest points of the first image fragment must have the same geometric relationship among themselves as the interest points. For the preferred case of two interest points, the Euclidean distance between the interest points will of course correspond to the Euclidean distance between the pixels aligning to them in the second image fragment.

To identify the alignments for which this geometric relationship holds, the lists associated with each interest point are searched for groups of pixels having the same geometric relationship among themselves as the interest points. If only one group of pixels matches this criterion within a predetermined tolerance, that group of pixels is used to determine the new refined alignment. If more than one group of pixels meets this criterion within the predetermined tolerance, the centroids of closely clustered pixels are used as the basis for determining the refined alignment.

The invention will be better understood by reference to the following detailed description in connection with the accompanying drawings.

BRIEF DESCRIPTION OF DRAWINGS

FIG. 9 depicts an exemplary user alignment of four overlapping image fragments.

FIG. 10 depicts the image fragments of FIG. 9 as aligned in accordance with one embodiment of the present invention.

FIGS. 11A–11J depict the alignment of two overlapping image fragments of FIG. 9 in accordance with one embodiment of the present invention.

DESCRIPTION OF SPECIFIC EMBODIMENTS

System Suitable for Implementation of Present Invention

Figure 2:
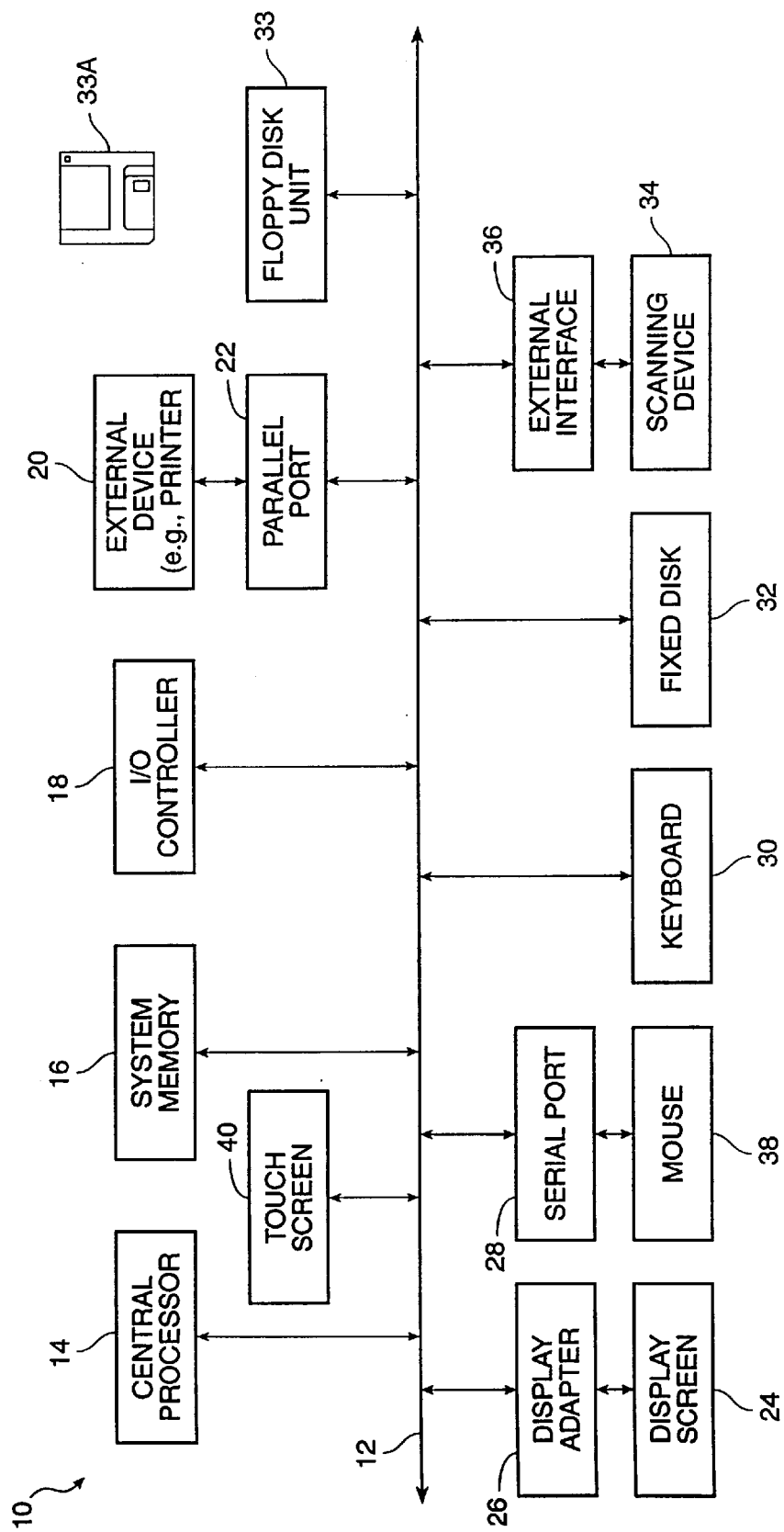
FIG. 2 depicts basic subsystems of a computer system suitable for use with the present invention.

FIG. 2 shows basic subsystems of a computer system suitable for use with the present invention. In FIG. 2, computer system 10 includes bus 12 which interconnects major subsystems such as central processor 14, system memory 16, input/output (I/O) controller 18, an external device such as a printer 20 via parallel port 22, display screen 24 via display adapter 26, serial port 28, keyboard 30, fixed disk drive 32 and floppy disk drive 33 operative to receive a floppy disk 33A. Many other devices can be connected such as scanning device 34 connected via external interface 36, mouse 38 connected via serial port 28 and touch screen 40 connected directly. Many other devices or subsystems (not shown) may be connected in a similar manner. Also, it is not necessary for all of the devices shown in FIG. 2 to be present to practice the present invention, as discussed below. The devices and subsystems may be interconnected in different ways from that shown in FIG. 2. The operation of a computer system such as that shown in FIG. 2 is readily known in the art and is not discussed in detail in this application. Source code to implement the present invention may be operably disposed in system memory 16 or stored on storage media such as fixed disk 32 or floppy disk 33A.

Figure 3:
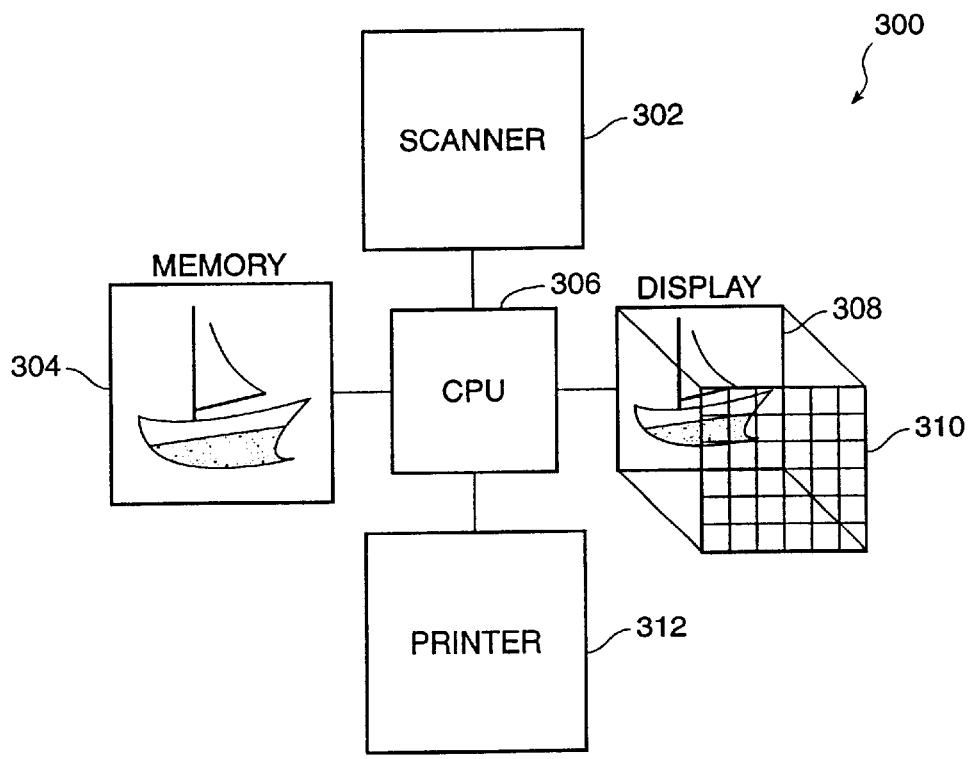
FIG. 3 depicts a configuration of subsystems for a preferred embodiment.

FIG. 3 shows configuration 300 for a preferred embodiment including scanner 302, memory 304, CPU 306, display 308, touch screen 310 and printer 312. Configuration 300 could implement, for example, a copier machine. Configuration 300 could also be a portion of hardware in a fax machine or scanner. In the currently preferred embodiment, scanner 302 is a Ricoh IS60 600 dpi grayscale scanner. Printer 312 is a 600 dpi, 8 pages per minute laser printer. CPU 306 is a Sun Sparc 10 workstation. The present invention is adaptable for use in any system where an oversize image must be scanned piecemeal so that multiple overlapping fragments of the oversize image are input into the system and must be registered to one another.

Display 308 can be a liquid crystal display (LCD) screen or a cathode ray tube (CRT) screen or other type of display screen or panel. The display screen is similar to that in use on standard computers such as personal computers or workstations employing a CRT screen or monitor. Various forms of user input devices may be used with the present invention. For example, even though a touch screen is shown in FIG. 3, a mouse input device that allows a user to move a pointer displayed on the display screen in accordance with user hand movements is a standard user input device. A mouse usually includes one or more buttons on its surface so that the user may point to an object on the screen by moving the mouse and may select the object, or otherwise activate the object, by depressing one or more buttons on the mouse. The touch screen allows a user to point to objects on the screen to select an object and to move the selected object by pointing to a second position on the screen. Various buttons and controls may be displayed on the screen for activation by using the mouse or touch screen.

Alignment of Multiple Image Fragments

Figure 4:
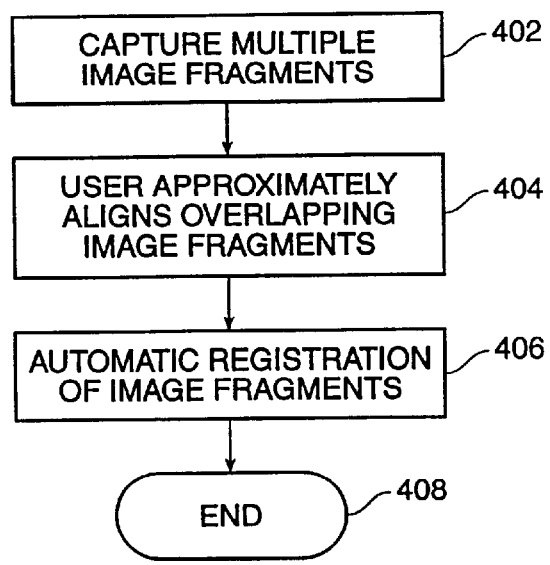
FIG. 4 is a flowchart describing the steps of aligning multiple overlapping image fragments in accordance with one embodiment of the present invention.

FIG. 4 is a flowchart describing the steps of aligning multiple overlapping image fragments in accordance with one embodiment of the present invention. At step 402, the system of the preferred embodiment captures fragments of an image. This could be e.g., through successive uses of scanner 302 on a large format document. The image fragments could be scanned in by a local facsimile communications device or received from a remote facsimile communications device. However, the image fragments are captured, their electronic representations are available for further processing within system memory 16. Typically, the image fragments are represented as arrays of pixels each having an electronically stored pixel value.

At step 404, the user preferably employs a user interface to approximately align the image fragments to one another to recreate the original image. The user makes use of, for example, mouse 38 or touch screen 40 to manipulate the images. Feedback as to the present position of the image fragments is found on display screen 24. A complete description of the image fragment manipulation process used in the preferred embodiment can be found in U.S. patent application Ser. No. 08/446,196 (which is now U.S. Pat. No. 5,732,230 issued Mar. 24, 1998).

The purpose of the user alignment is to simplify the later automated alignment. When automated registration is invoked, the system of the preferred embodiment already knows which fragments overlap. The placement of the fragments is also known to within a given threshold distance of the best registration. Preferably, this distance is 1 inch which at 100 dpi is 100 pixels. Although, it would require much extensive computation, it would be possible within the scope of the present invention to align the image fragments entirely automatically. At the completion of step 404, not only the image fragments are stored electronically, but their approximate alignments as determined by the user are also.

At step 406, the system of the preferred embodiment, automatically aligns the image fragments. The operation of step 406 will be described in greater detail with reference to FIGS. 5–8. The alignment process terminates at step 408, with the complete reassembled image left available for further processing.

Figure 1:
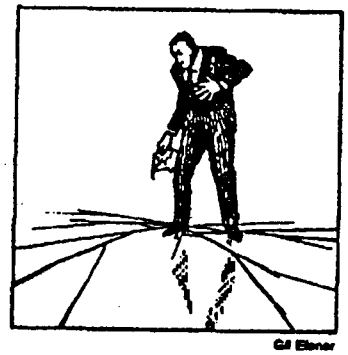
FIG. 1 depicts the result of aligning overlapping image fragments in accordance with the prior art.

In accordance with the invention, the alignment process takes advantage of total error information concerning the image as a whole to produce accurate registration of every pair of overlapping image fragments. Thus, artifacts as shown in FIG. 1 caused by propagation of misalignments between successive pairs of image fragments are avoided.

The preferred embodiment thus optimizes alignment error both between individual image fragment pairs and for the image as a whole. Before discussing in detail the image fragment alignment process of the preferred embodiment, it will be useful to discuss metrics that can be used to measure the alignment of images or portions of images to one another.

One metric is the cross-correlation. The computation of the normalized cross correlation between two windows A and B of size M×N is summarized by the formula:

$$\sigma = \frac{\sum_{i=1}^{M} \sum_{j=1}^{N} a(i, j)b(i, j)}{\sqrt{\left(\sum_{i=1}^{M} \sum_{j=1}^{N} a^2(i, j)\right)\left(\sum_{i=1}^{M} \sum_{j=1}^{N} b^2(i, j)\right)}} \quad (1)$$

where a(x,y) and b(x,y) represent pixel values of windows A and B at a particular coordinate. For an optimal alignment or match, between the windows A and B, the value of θ is close to +1. The cross-correlation score is however very computationally intensive.

The preferred embodiment instead makes use of the so-called L1 norm to measure alignment error. This is done for windows A and B by finding ε, whose computation is summarized by the formula:

$$\varepsilon = \sum_{i=1}^{M} \sum_{j=1}^{N} |a(i, j) - b(i, j)| \quad (2)$$

The lower the value of ε, the better the match. This L–1 norm is much easier to compute, since it involves only summations and not multiplications or divisions as required by the cross-correlation score. The application of the L1 norm to measuring alignment error between two overlapping image fragments is described in [Barnea72].

The image fragment alignment method of one embodiment of the present invention will first be described with reference to flowcharts in FIGS. 5–8. The application of the present invention to a particular example of obtaining an image of a large format document, a map, will then be described in reference to FIGS. 9–11.

Figure 5:
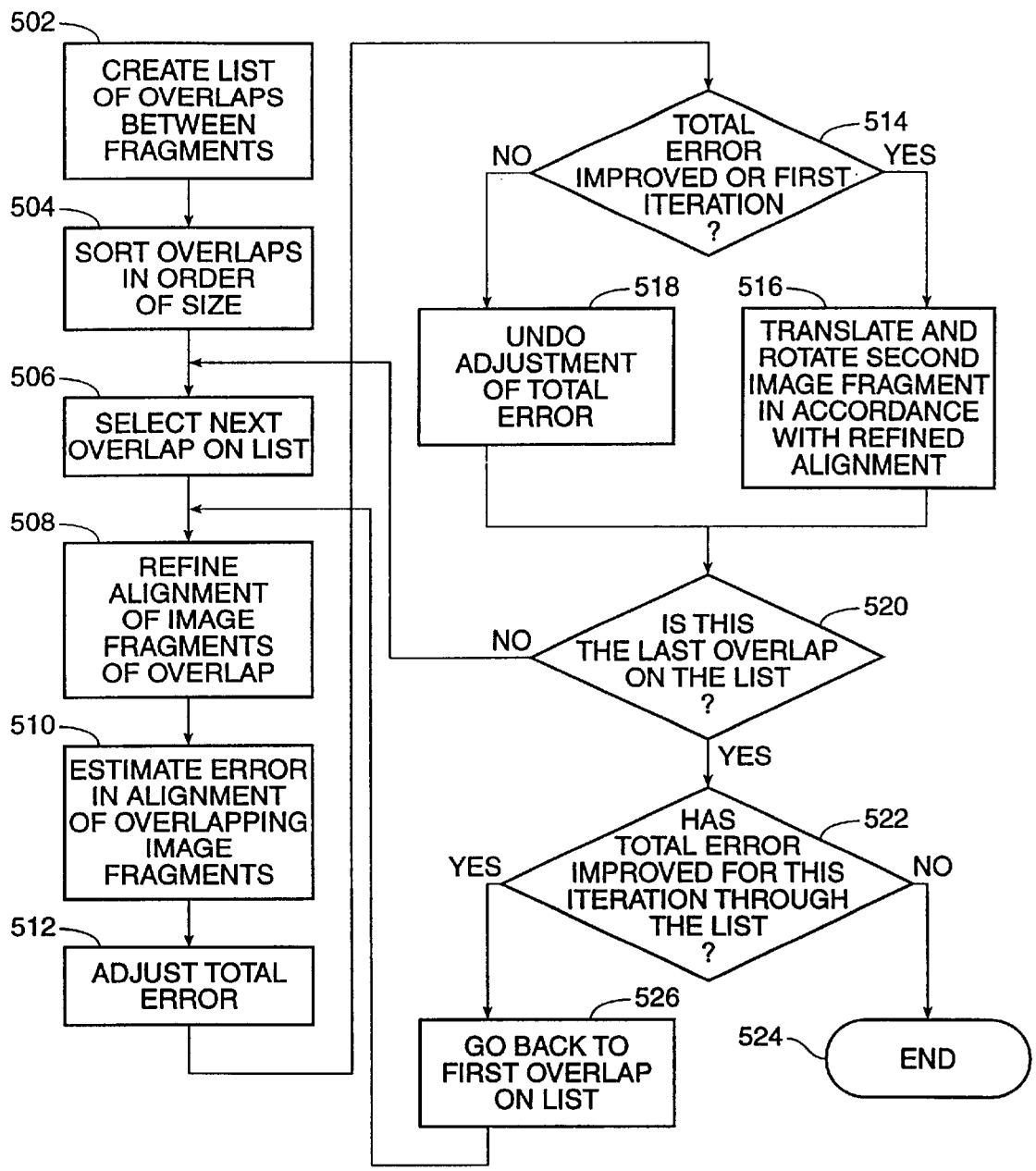
FIG. 5 is a flowchart describing the steps of registering multiple overlapping image fragments in accordance with one embodiment of the present invention.

FIG. 5 is a flowchart describing the steps of registering multiple overlapping image fragments in accordance with one embodiment of the present invention. At step 502, the preferred embodiment constructs a list of the overlaps between image fragments responsive to the approximate alignment identified by the user at step 404 of FIG. 4.

At step 504, the alignments are preferably sorted in order of size of the overlap areas. One fragment, a member of the overlap pair participating in the largest overlap is selected to be the frame of reference for the other fragments.

Step 506 begins a loop that proceeds through every overlap on the list generated at step 502. For the first iteration of this loop, the first overlapping pair of image fragments on the list is selected for processing. At step 508, the alignment of these two overlapping image fragments is refined to identify a potential improved alignment. This alignment step is performed only in reference to the two overlapping image fragments. Many techniques could be used for improving the alignment of two overlapping image fragments. The techniques used by the preferred embodiment are described in reference to FIGS. 6–8.

Although an improved alignment is identified at step 508, this improved alignment is not necessarily applied to the overlapping image fragments. Once step 508 has generated an improved alignment for an overlapping image fragment pair, the alignment error for this improved alignment is calculated at step 510, preferably in accordance with the L1 metric described above. The total alignment error, as measured by the L1 metric, for all the image fragment pairs is then adjusted at step 512 to reflect the improved alignment identified in step 508. For the first pass through the list, the improved alignment value is simply added into the total error measure which is being developed for the first time. For later iterations, the alignments of all overlap pairs are evaluated and summed together. Only overlaps affected by the improved alignment need to have their alignment errors recalculated.

At step 514, the procedure of the preferred embodiment checks if the total alignment error has improved or whether this is the first iteration rendering the increase to the total alignment error irrelevant for determining the flow of execution. If the total alignment error is improved by the incorporation of this new alignment or if this is in fact the first iteration through the list, execution proceeds to step 516 where the improved alignment identified at step 508 is confirmed by translating and rotating the second image fragment of the pair. If this is not the first iteration through the list and the total alignment error is increased by the incorporation of this improved alignment, the improved alignment identified at step 508 is not applied to the image fragment pair, and the total error of this refined alignment is readjusted to its previous state at step 518.

After the execution of step 516 or 518, processing of the selected image fragment pair is completed for this iteration through the list of pairs. At step 520, the preferred embodiment determines whether the last overlapping pair on the list has just been processed, meaning that the alignment of each pair on the list has been refined. If further pairs remain on the list, execution proceeds to step 506 where processing of the next overlapping image fragment pair commences.

The next overlap to be considered will preferably be the next largest overlap that has one fragment with the frame of reference fragment, or another fragment that has previously been registered. If every such pair has already been registered, other pairs can then be visited. These rules do not completely determine a particular order and any order could be used within the scope of the present invention, although results may vary somewhat depending on the order used.

If the last overlapping image fragment pair on the list has just been processed, execution instead proceeds to step 522, where the preferred embodiment checks to see if there has been any improvement in total error in this pass through the list. If the total error is found to have improved at step 522, the preferred embodiment resets to the first image fragment pair on the list at step 526 and again begins the loop starting at step 506.

If the total error is found to have not improved at step 522, optimization is terminated at step 524 and a complete image is formed from the final alignments of each image pair. A number of techniques could be used to determine pixel values of the complete image in the overlap areas. In the preferred embodiment, where aligned image fragments overlap, the pixel values corresponding to the first scanned fragment are used for the complete image.

Thus, FIG. 5 describes a procedure for optimizing total alignment error by successively refining the alignment of overlapping pairs of images while controlling total alignment error. It should be clear that many modifications of the procedure of FIG. 5 would be possible within the scope of the present invention. For example, the list of overlapping pairs could be ordered in terms of error contribution rather than overlap area. A fixed number of iterations could be used. Alternatively, the optimization process could be modified so that certain improved alignments of overlapping image fragments that increase total error could be accepted in accordance with simulated annealing techniques as described in [Kirkpatrick83], the contents of which are herein incorporated by reference.

Alignment of a Pair of Overlapping Image Fragments

Figure 6A:
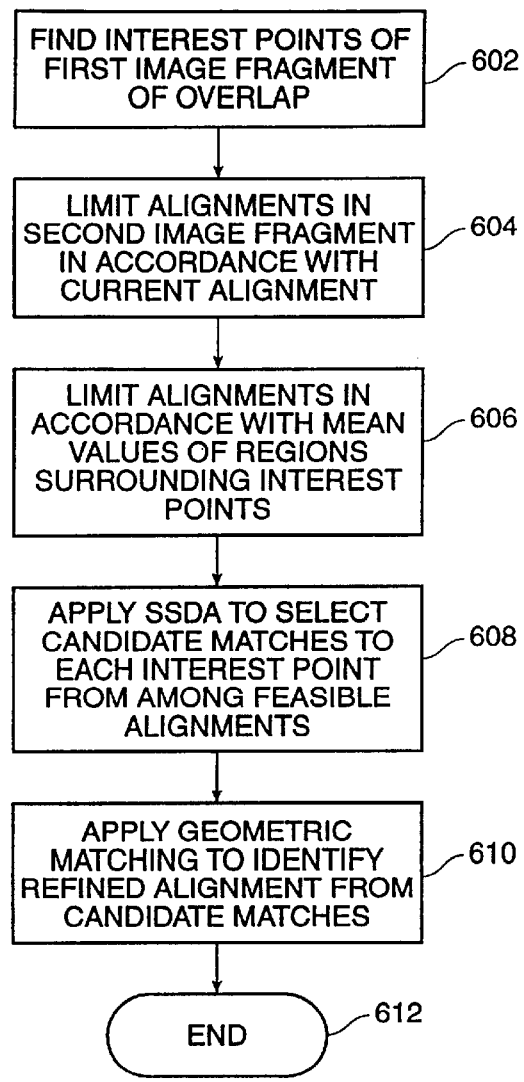
FIG. 6A is a flowchart describing the steps of registering first and second overlapping image fragments in accordance with one embodiment of the present invention.

FIG. 6A is a flowchart describing the steps of registering first and second overlapping image fragments in accordance with one embodiment of the present invention. The procedure of FIG. 6A finds application as one step in the registration of multiple overlapping image fragments, implementing, for example, step 508 of FIG. 5. However, the procedure of FIG. 6A can also be used in other situations where two overlapping image fragments are to be automatically registered.

At step 602, the preferred embodiment searches for so-called interest points in the first image fragment of the overlap. Interest points are pixels within an image that lie within areas that have distinctive features that enable easy matching. By concentrating on matching only areas around the interest points, processing time is greatly reduced. Many techniques for identifying interest points are known to those of skill in the art. A survey of interest point identifying techniques can be found in [Yan88], the contents of which are herein incorporated by reference. The preferred interest point identifying technique is described in reference to FIGS. 7A–7B. Preferably, two interest points are identified in the first overlapping image fragment and further processing centers around identifying areas in the second image fragment that match to areas surrounding these two interest points.

At step 604, the preferred embodiment limits the area of the second image fragment searched for matches in accordance with the user alignment developed at step 404. For each interest point, the space of possible translational shifts is limited to a predefined region surrounding the pixel in the second image fragment that is currently aligned to that interest point.

At step 606, further limitation on the search area is based on an evaluation of the mean pixel values of regions surrounding the interest points. For each interest point, the mean pixel value of a region surrounding the interest point is computed. The region shape is selected so that rotation of the region relative to the image is irrelevant to evaluation of the mean. The region is preferably a circle but other shapes are possible also including an annulus.

For each pixel in the overlapping area of the second image fragment, the preferred embodiment computes the mean pixel value of a similarly sized region surrounding the pixel. This mean pixel value is compared to the mean pixel values obtained for the interest points. For each interest point, if the mean pixel value surrounding the second image fragment pixel is within a predetermined tolerance (10% in the preferred embodiment) of the mean pixel value determined for the region surrounding the interest point, the second image fragment pixel is retained as a basis for candidate matches for that interest point. The result of step 606 is a list for each interest point of pixels in the second image fragment that serve as the basis for candidate matches. The search space of candidate matches is thus greatly reduced.

Figure 6B:
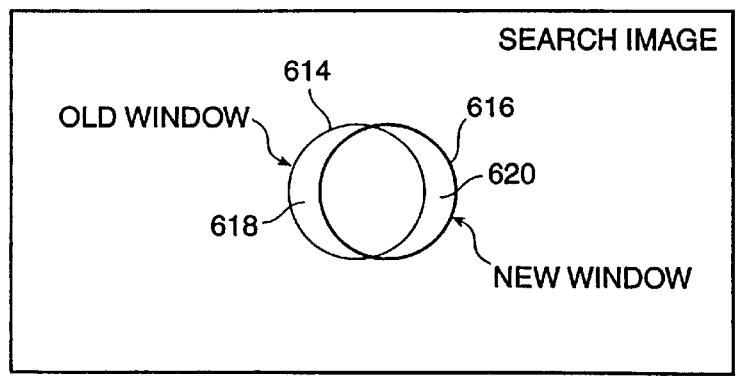
FIG. 6B depicts how the mean of a window of an image may be calculated in accordance with one embodiment of the present invention for the purpose of limiting a search area in the second overlapping image fragment.

To simplify calculation of the mean for successive circular regions, a rolling mean is calculated for the circular regions as shown in FIG. 6B. FIG. 6B shows an old window 614 or circular region in the second image fragment for which the mean pixel value has already been computed and a new window 616 for which the mean pixel value has not been computed. A rear crescent 618 lies within old window 614 but not within new window 616. A front crescent 620 lies within new window 616 but not within old window 614. The mean for the new window can be computed by:

$$N\mu_{new} = N\mu_{old} + \sum_{i,j \in F} f(i,j) - \sum_{i,j \in R} f(i,j) \qquad (3)$$

where N is the number of pixels in the region or window, $\mu$ is the mean, F and R are the front crescent 620 and rear crescent 618, respectively. Thus, only the pixel sums for the front and rear crescents have to be computed.

At step 608, the remaining possible candidate matches for each interest point are searched to find the best alignment. Each candidate match represents a combination of a rotational alignment and a translation alignment between two overlapping image fragments. Each pixel included in the list generated by step 606 represents one possible translational alignment, namely the alignment of that pixel in the second image fragment to the interest point in the first image fragment. Rotational alignments are preferably searched within 10 degrees in either direction from the current rotational alignment, as determined by the user, in one degree increments.

The search of step 608 proceeds along the lines described in [Barnea72], the so-called sequential similarity detection algorithm (SSDA). The search for matches is conducted separately for each interest point. For each alignment to be tested, the L1 metric is preferably used to measure the alignment error between a template region surrounding the interest point and the corresponding similarly shaped and sized region in the second image fragment. The template region is preferably 16 pixels in diameter. As described above, the L1 metric is computed as a sum over many pixels. In accordance with SSDA techniques, this sum is monitored and if a threshold is exceeded, computation for that alignment terminates on the assumption that the alignment cannot represent a refinement. Preferably, this threshold is fixed and corresponds to a maximum error for 15% of the pixels of the region with the other pixels being identical. Alternatively, a threshold curve of error growth may be used or a threshold that varies responsive to previously measured alignment errors.

Many variations on this search technique could be used within the scope of the present invention. For example, a cross-correlation metric could be used instead of the L1, although this would significantly slow processing. Note that the metric used for searching need not be the same metric used for measuring alignment error over the whole overlap area or total alignment error over many image fragments as described in reference to FIG. 5. Also, the template region could be a sparse window, i.e. a region surrounding the interest point with some pixels deleted to speed alignment error computations.

The result of the search of step 608 is a list, for each interest point, of candidate translational matches to that interest point that have alignment errors that fall below a threshold. Typically, there will be three or four alignments per list. Although, both rotation and translation are varied to find these alignments, only the translational components of these alignments are stored. As will be explained in reference to FIG. 8, the rotational component of the refined alignment is derived in a different way. The translational component of each alignment to an interest point can be represented as the location of the pixel of the second image fragment that aligns with that interest point.

At step 610, a single refined alignment is selected from the candidate alignments identified at step 608. In accordance with the preferred embodiment of the invention, the alignment is selected by looking for group of alignments, one alignment for each interest point, whose translational components have the same geometric relationships as the interest points themselves. This geometric matching procedure is described in reference to FIG. 8. For the case of multiple image fragment matching, this refined alignment becomes the improved alignment referred to in reference to step 508. If only two image fragments are to be aligned, the refined alignment can be immediately applied by shifting one or both of the fragments accordingly. At step 612, the process of finding a refined alignment for two image fragments terminates.

Figure 7A:
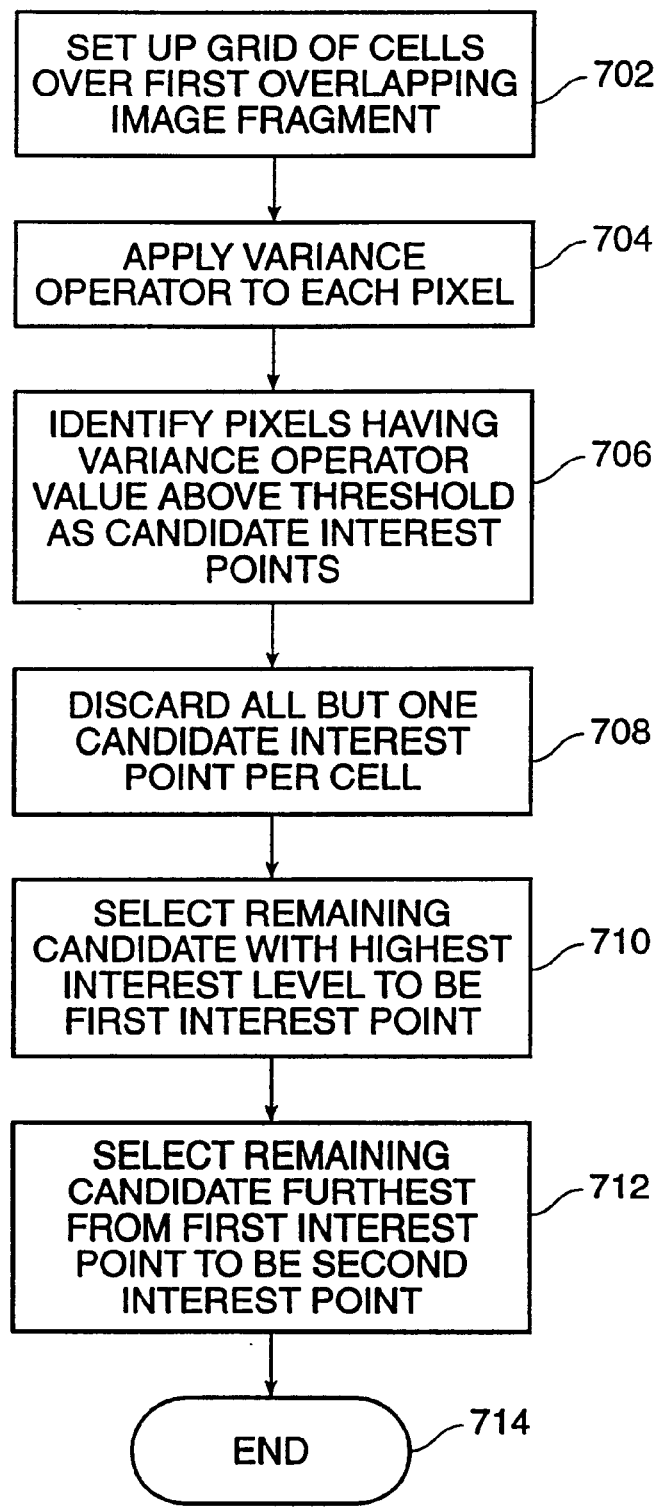
FIG. 7A is a flowchart describing the steps of finding interest points in a first of the overlapping image fragments of FIG. 6A in accordance with one embodiment of the present invention.

FIG. 7A is a flowchart describing the steps of finding interest points in the first overlapping image fragment in accordance with one embodiment of the present invention. The steps of the flowchart of FIG. 7A represent one instantiation of step 602 of FIG. 6A. At step 702, the preferred embodiment segments an overlapping area of the first image fragment into a grid of cells. At step 704, a variance operator is applied to each pixel to obtain a numerical index of the interest level of the pixel for matching purposes. In the preferred embodiment, the variance operator applied is a Moravec operator enhanced in accordance with the invention. The enhanced Moravec operator of the invention is described in reference to FIG. 7B. Many suitable variance operators could be applied within the scope of the present invention. A survey of variance operators including the prior art Moravec operator can be found in [Yan88].

At step 706, the pixels whose interest levels do not exceed a predetermined threshold are discarded as possible candidate interest points. At step 708, the candidate interest points are further pruned by limiting each grid cell to a single interest point. Thus, each grid cell contains either one or zero interest points. Then, at step 710 a first interest point is selected from the candidates to be the candidate interest point with the highest interest level as determined in step 704. At 712, a second interest point is selected to be the candidate interest point furthest away from the first interest point. At step 714, the interest point determination process terminates.

Figure 7B:
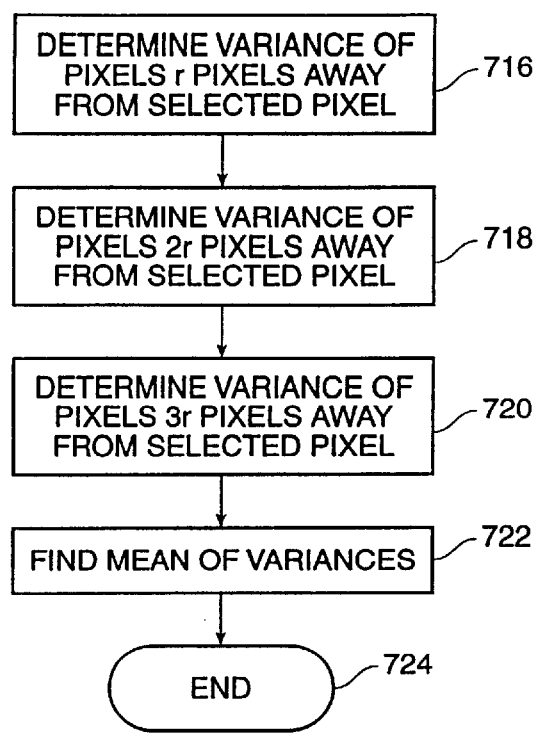
FIG. 7B is a flowchart describing the steps of applying a modified Moravec's variance operator to pixels of the first overlapping image fragment in accordance with one embodiment of the present invention.

FIG. 7B is a flowchart describing the steps of applying a modified Moravec's variance operator to a particular pixel of the first overlapping image fragment in accordance with one embodiment of the present invention. The steps depicted in FIG. 7B represent one instantiation of step 704 of FIG. 7A.

Figure 7C:
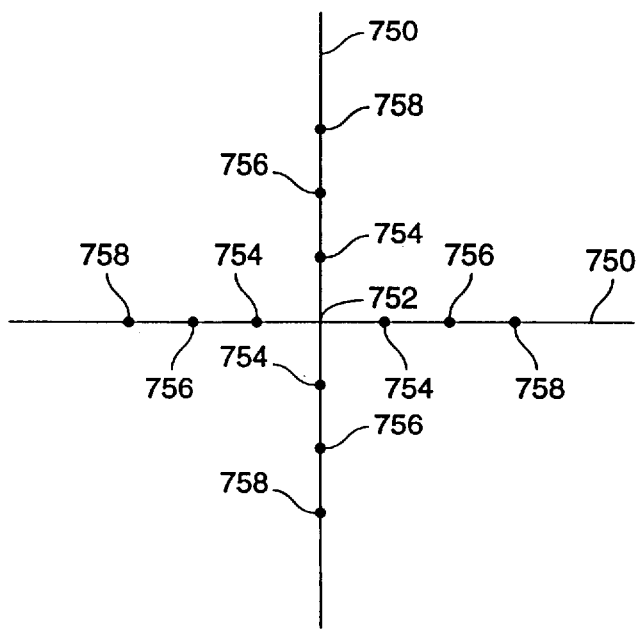
FIG. 7C is a diagram depicting the pixels employed in calculating a modified Moravec's variance operator in accordance with one embodiment of the present invention.

FIG. 7C depicts the pixels preferably used to determine the modified Moravec's operator. Orthogonal axes 750 intersect at selected pixel 752 whose modified Moravec's variance operator is to be calculated. A first set of four pixels 754 are r pixels away from selected pixel 752 along the orthogonal axes, where 3r is the radius of the template region used in step 608. A second set of four pixels 756 are 2r pixels away from selected pixel 752. A third set of pixels 758 are 3r pixels away from selected pixel 752.

At step 716, the preferred embodiment finds the variance of the pixel values of pixels 754. At step 718, the preferred embodiment finds the variance of the pixel values of pixels 756. At step 720, the preferred embodiment finds the variance of the pixel values of pixels 758. At step 722, the modified Moravec's variance operator is calculated to be the mean of these three variances. The variance operator calculation process then terminates at step 724. Of course, a different number of variances could be calculated and averaged together within the scope of the invention.

Figure 8:
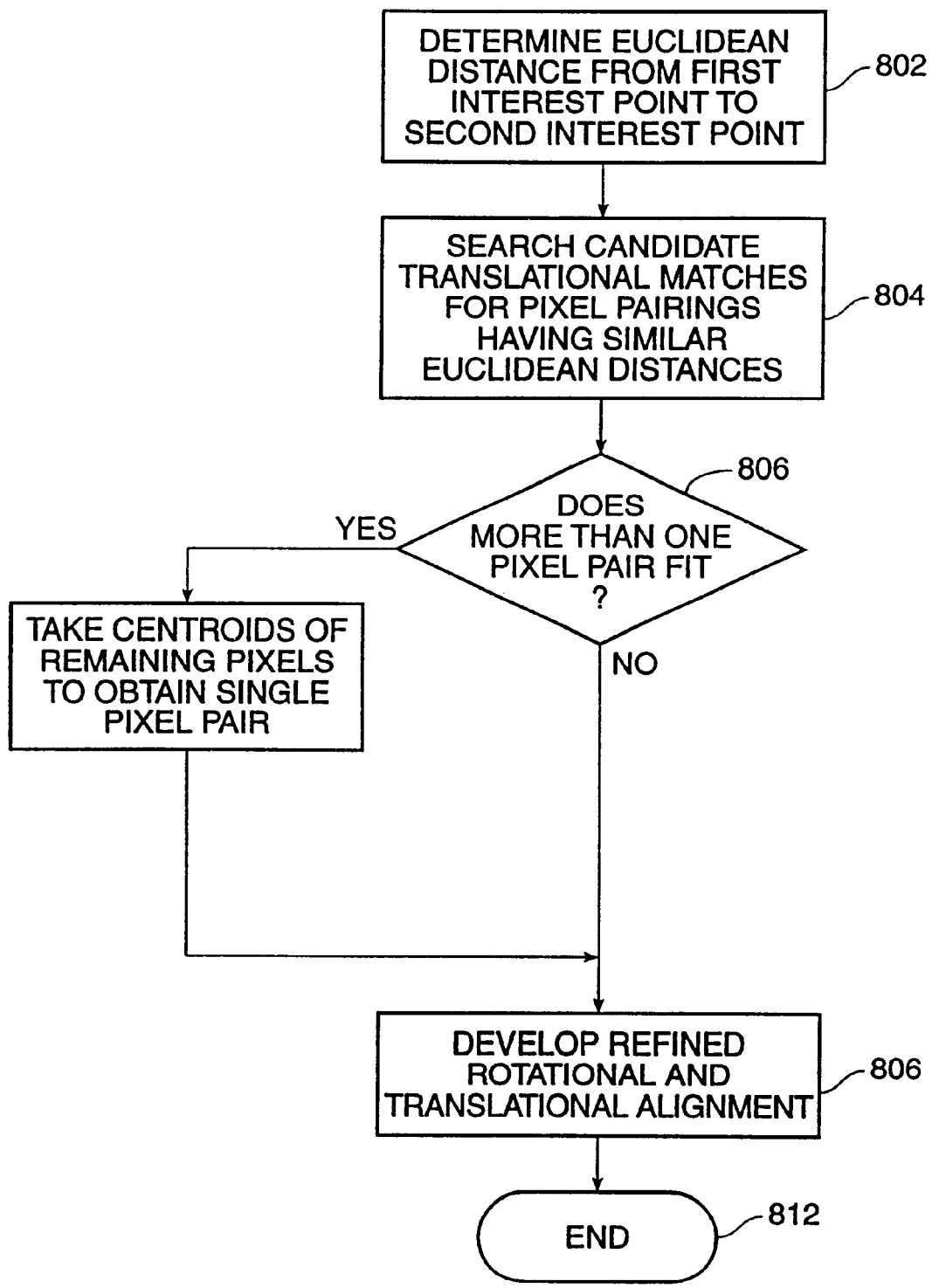
FIG. 8 is a flowchart describing the steps of applying geometric relations to a list of candidate matches of interest points of a first image fragment to pixels of a second image fragment to identify a refined alignment between the first and second image fragments in accordance with one embodiment of the present invention.

FIG. 8 is a flowchart describing the steps of applying geometric relations to a list of candidate matches of interest points of a first image fragment to pixels of a second image fragment to identify a refined alignment between the first and second image fragments in accordance with one embodiment of the present invention. The steps of the flowchart of FIG. 8 represent one instantiation of step 610 of FIG. 6A.

At step 802, the preferred embodiment determines the Euclidean distance in pixel widths between the interest points to an accuracy of +/−0.1 pixels. At step 804, the preferred embodiment determines the Euclidean distance in the second image fragment for every possible pairing of a pixel representing a candidate translational match to the first interest point and a pixel representing a candidate translational match to the second interest point, looking for pixel pairs that have Euclidean distances that are same as the inter-interest point Euclidean distance to within +/−1.1 pixel widths.

The pair or pairs of candidate translational matches that satisfy this Euclidean distance criterion are then used to identify the refined alignment between the two image fragments. Step 806 determines if there is more than one pair of pixels that satisfies the Euclidean distance criterion. If there is only one pair of pixels that satisfies the criterion, execution proceeds directly to step 808. If there is more than one pixel pairing that satisfies the criterion, step 810 takes the centroids for the surviving pixels corresponding to the first interest point and the surviving pixels corresponding to the second interest point. The pixels of the resulting centroid pair then serve as candidate translational matches to the first and second interest points.

At step 808, the refined alignment is generated in accordance with the candidate translational match pair. One of skill in the art will appreciate that the pixel representing the remaining candidate translational match to the first interest point by itself determines the translational component of the refined alignment between the first and second image fragments. The rotational component is then determined by calculating an angle between an imaginary line that connects the first and second interest points in the first image fragment with an imaginary line between the pixels representing the remaining pair of candidate translational matches. The geometric matching process then terminates at step 812.

Examples of Image Fragment Alignment

FIGS. 9–11 depict how the present invention may be applied to copying a newspaper page. FIG. 9 depicts overlapping scanned image of a newspaper page. Four 8×10 inch image fragments 902, 904, 906, and 908 were taken using a desktop scanner such as scanner 302. Each of these scans were made such that an overlap of at least 25% existed with the neighboring scan. The images were captured at 100 dpi. FIG. 9 depicts image fragments 902, 904, 906, and 908 as displayed after initial alignment by the user. Arrows 910 and 912 point to areas of misregistration between two of the overlapping fragments.

FIG. 10 depicts image fragments 902, 904, 906, and 908 as aligned in accordance with one embodiment of the invention. Processing time to register the four fragments was approximately 45 to 50 seconds using a 50 MIPS Sun Sparc 10 workstation with 50 Megabytes of main memory. Approximately 30% of this time is spent rotating and translating the fragments into place. Processing time for the same set image fragments may vary by as much as 5% depending on the initial user placement. The registration has been measured to be accurate to within one pixel in the vertical and horizontal directions, and to within 0.1 degrees of rotation.

Figure 11B:
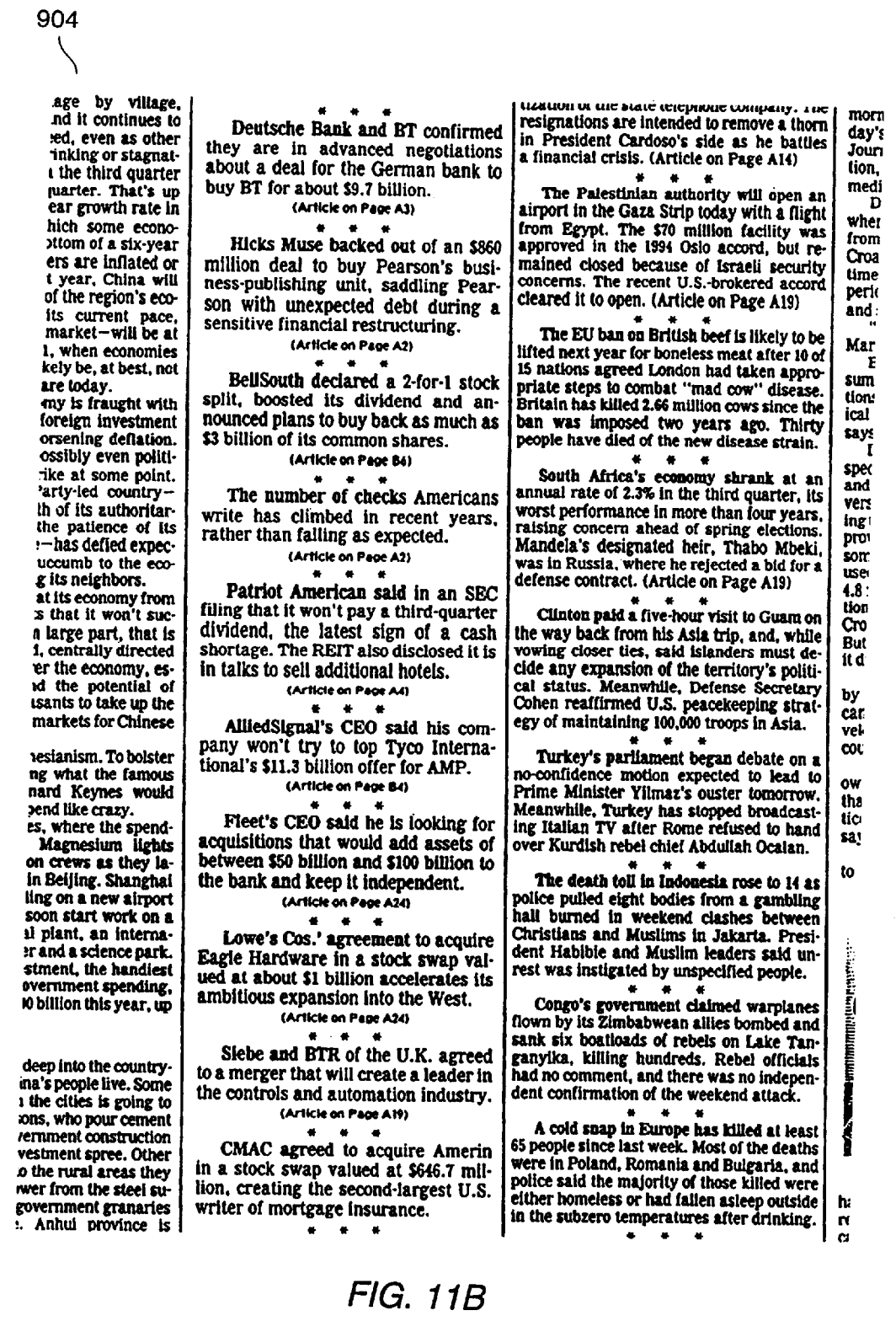
Figure 11C:
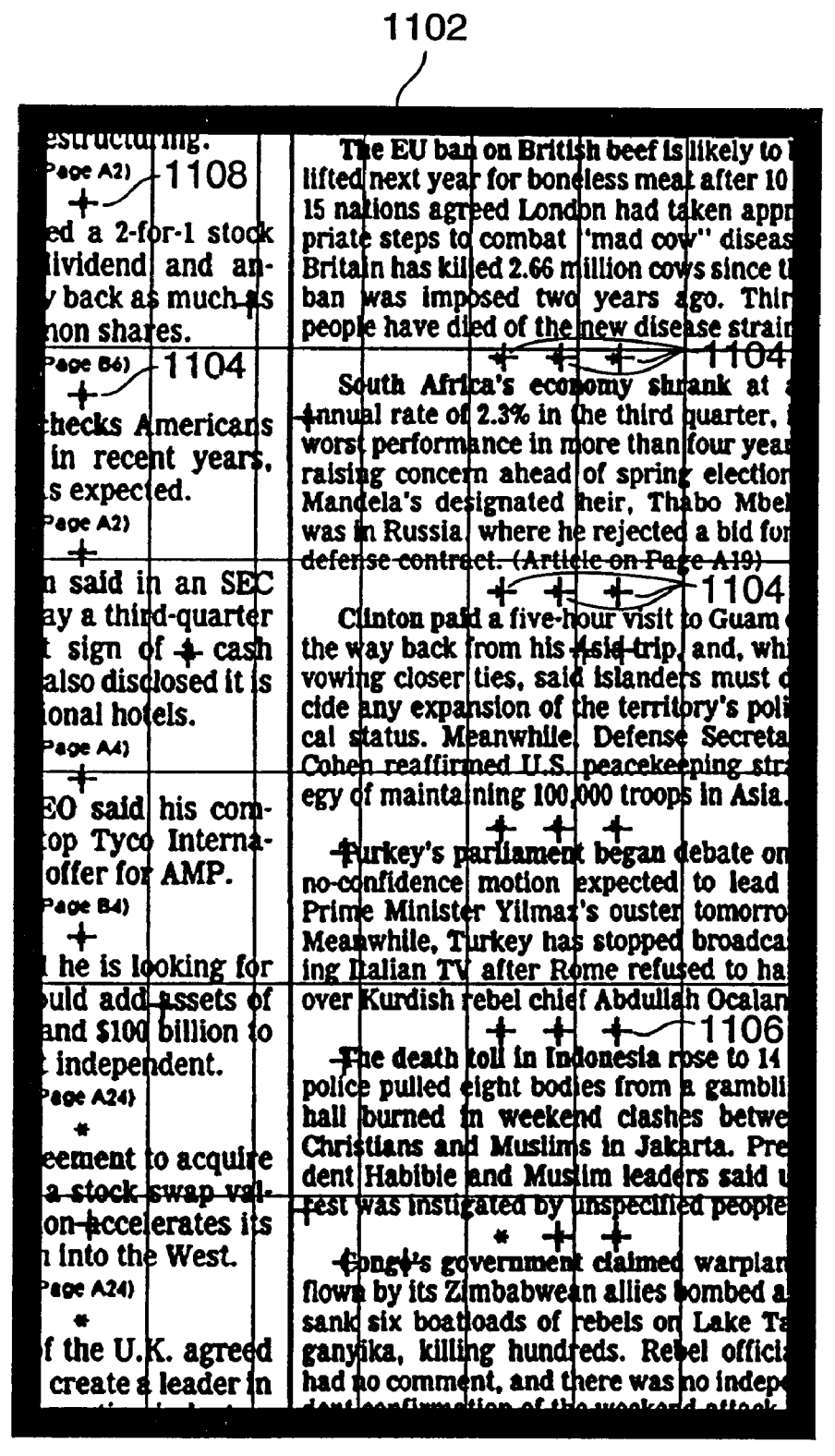
Figure 11H:
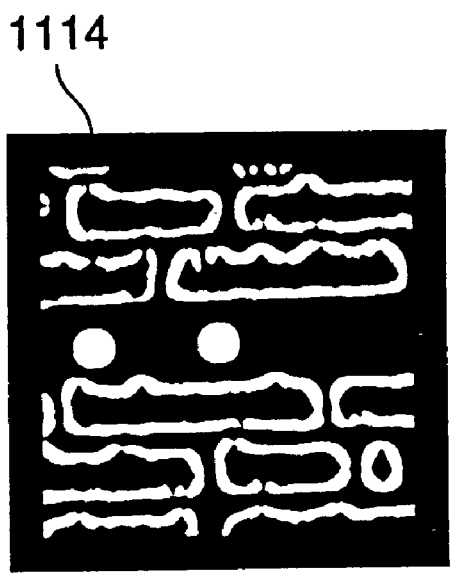

FIGS. 11A–11J depict how two image fragments are aligned to one another in accordance with one embodiment of the present invention. FIG. 11A depicts image fragment 902 from the map depicted in FIG. 9. FIG. 11B depicts image fragment 904 from the map depicted in FIG. 9. The alignment of image fragments 902 and 904 is to be refined in accordance with the invention as one step of the refinement of all four image fragments.

FIG. 11C depicts an overlapping section of image fragment 902 overlaid with a grid 1102 for finding interest points as described in reference to FIG. 7B. Each cell of grid 1102 has one candidate interest point 1104 or no candidate interest points. A first selected interest point 1106 is the candidate with the highest interest level. A second selected interest point 1108 is the candidate interest point furthest away from first selected interest point 1106.

FIG. 11D depicts a template region 1110 that surrounds first interest point 1106 in image fragment 902. FIG. 11E depicts a template region 1112 that surrounds second interest point 1108 in image fragment 902. These are the template regions that are to be searched in second image fragment 904.

As was discussed in reference to FIG. 6A, for each interest point, the match search area in the second image fragment is first limited to a region surrounding the pixel of the second image fragment that is currently aligned to the interest point. FIG. 11F depicts a reduced search area 1114 of the second image fragment that will be used to match first interest point 1106. FIG. 11G depicts a reduced search area 1116 of the second image fragment that will be used to match second interest point 1108.

Figure 11I:
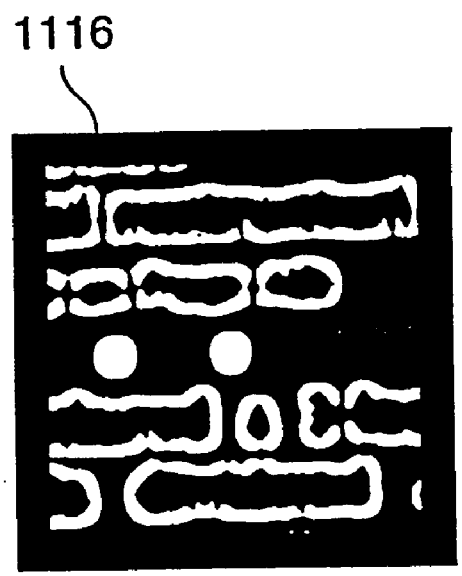

As was further discussed in reference to FIG. 6A, the next step of limiting the search area is to determine the means of the template regions surrounding the interest points and eliminate regions of the second image fragment that have different means. FIG. 11H depicts reduced search area 1114 with the pixels eliminated from contention as candidate alignments to first interest point 1106 marked in black. FIG. 11I depicts reduced search area 1116 with the pixels eliminated from contention as candidate alignments to second interest point 1108 marked in black.

FIG. 11J depicts an overlapping portion of image fragment 904 marked with candidate alignments to each interest point as generated by a search in accordance with a preferred embodiment of the invention. First interest point 1106 has candidate alignments 1118 and 1120. Second interest point 1108 has candidate alignment 1126. Once the geometric search of FIG. 8 is performed, only alignments 1120 and 1126 will remain since the Euclidean distance between them is substantially similar to the Euclidean distance between interest points 1106 and 1108. These alignments then become the candidate alignments to the interest points and the basis for determining the refined alignment between image fragments 902 and 904.

In the foregoing specification, the invention has been described with reference to a specific exemplary embodiment thereof. It will, however, be evident that various modifications and changes may be made thereunto without departing from the broader spirit and scope of the invention as set forth in the appended claims.

For example, various programming languages and techniques can be used to implement the disclosed invention. Also, the specific logic presented to accomplish tasks within the present invention may be modified without departing from the scope of the invention.

Furthermore, the flowcharts described herein are illustrative of merely the broad logical flow of steps to achieve a method of the present invention and that steps may be added to, or taken away from, the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software routines executing in a computer system. The routines may be implemented by any means as is known in the art. For example, any number of computer programming languages, such as "C", Pascal, FORTRAN, assembly language, etc., may be used. Further, various programming approaches such as procedural, object oriented or artificial intelligence techniques may be employed.

The steps of the flowcharts may be implemented by one or more software routines, processes, subroutines, modules, etc. Some considerations such as interrupt driven, polled, or other implementation schemes may affect the order of steps performed by software. A multiprocessing or multitasking environment could allow steps to be executed "concurrently."

Many such changes or modifications will be readily apparent to one of ordinary skill in the art. The specification and drawings are, accordingly, to be regarded in an illustrative rather than a restrictive sense, the invention being limited only by the provided claims.

Source Code Appendix

The microfiche source code appendix includes C code to implement one instantiation of the present invention. When compiled and linked to standard libraries, it will run on for example, a Sun Sparc 10 workstation, available from Sun Microsystems in Mountain View, Calif.

Bibliography

[Barnea72] D. I. Barnea and H. F. Silverman, A Class of Algorithms for Fast Digital Image Registration, IEEE Trans. on Computers, Vol. C-21, 1972, pp. 179–186.

[Kirpatrick83] S. Kirkpatrick, C. Gelatt, M. P. Vecchi, Optimization by Simulated Annealing", Science, Vol 220, Number 4598, pp671–680, May 1983.

[Yan88] Lu Yan, "Interest Operator and Fast Implementation, PR438.

What is claimed is:

1. In a digital image alignment system, a method for aligning more than two image fragments to assemble a complete image, the method comprising the steps of:
    receiving a list of overlapping image fragment pairs for the more than two image fragments, each overlapping image fragment pair having an overlap alignment and being associated with an alignment measure based on the overlap alignment, the list of overlapping image fragment pairs being associated with a total alignment measure, the total alignment measure being a sum of alignment measures for each of the overlapping image fragment pairs;
    selecting an overlapping image fragment pair from the list of overlapping image fragment pairs;
    adjusting the selected overlapping image fragment pair to arrive at an improved alignment from the overlap alignment of the selected overlapping image fragment pair;
    calculating the total alignment measure for all pairs of overlapping image fragments based on the improved alignment for the selected overlapping image fragment pair;
    determining whether the improved alignment produces an improvement in the total alignment measure;
    applying the improved alignment to the selected overlapping image fragment pair if the determination indicates that the total alignment error would improve as a result of applying the improved alignment, otherwise discarding the improved alignment to the selected overlapping image fragment pair if the determination indicates that the total alignment error would not improve as a result of applying the improved alignment; and
    repeatedly applying the selecting step, the adjusting step, the calculating step, the determining step, and the applying step to successive overlapping image fragment pairs to improve the total alignment measure.

2. The method of claim 1, further comprising receiving a user-defined alignment for the more than two image fragments, wherein the list of overlapping image fragment pairs is determined from the user-defined alignment.

3. The method of claim 1, further comprising sorting the list of overlapping image fragment pairs.

4. The method of claim 3, wherein the sorting is in an order of size of the overlap alignment of the overlapping image fragment pairs.

5. The method of claim 1, further comprising determining an alignment measure for the selected overlapping image fragment pair.

6. The method of claim 5, further comprising accumulating the determined alignment measure to arrive at the total alignment measure.

7. The method of claim 1, further comprising forming the complete image with the more than two image fragments based on an alignment determined from the repeatedly applying step.

8. The method of claim 1, wherein the alignment measure is determined from at least one of a cross-correlation metric and L1 norm.

9. The method of claim 1, wherein the adjusting step comprises identifying a plurality of interest points in an overlapping area within a first image fragment of the selected overlapping image fragment pair to match, to a region of a second image fragment of the selected overlapping image fragment pair.

10. The method of claim 9, wherein the adjusting step comprises applying a variance operator to pixels of the overlapping area within the first image fragment.

11. The method of claim 9, wherein the adjusting step comprises: 1) overlaying a grid of cells over the overlapping area within the first image fragment, 2) applying a variance operator for each pixel in said overlapping area within the first image fragment to identify pixels for which an interest level exceeds a predetermined threshold, 3) selecting as potential interest points pixels having a greatest interest level in each said cell that includes a pixel for which said interest level exceeds a predetermined threshold, 4) selecting as a first interest point, one of said potential interest points having the greatest interest level, and 5) selecting as a second interest point, one of said potential interest points furthest away from said first interest point.

12. The method of claim 9, wherein the adjusting step comprises, for each of the plurality of interest points, measuring an alignment error of a plurality of possible alignments of regions of the second image fragment to a region surrounding the interest point in accordance with a second predetermined metric.

13. The method of claim 12, wherein the adjusting step comprises measuring an alignment error of each possible alignment on a pixel-by-pixel basis and further comprises:
    terminating measurement of a particular alignment when an alignment error exceeds a threshold.

14. The method of claim 12, wherein the adjusting step further comprises, for each interest point, selecting as a group of candidate translational matches, ones of the plurality of possible alignments having a lowest measured alignment error, to obtain a group of candidate translational matches for each interest point.

15. The method of claim 14, wherein the adjusting step further comprises:
    comparing candidate translational matches between said groups to select one or more sets of candidate translational matches, each set containing a candidate translational match from each group, each of said one or more sets having geometric relationships therebetween substantially similar to the geometric relationships between said plurality of interest points.

16. The method of claim 15, wherein the adjusting step further comprises:
    if more than one set of candidate translational matches is selected, converting a set of centroids of pixels belonging to the more than one set of candidate translational matches to a refined alignment, and if only one set of candidate translational matches exists, converting the one set of candidate translational matches to the refined alignment.

17. The method of claim 12, wherein the adjusting step further comprises:
    1) obtaining mean pixel values for regions of the first image fragment surrounding each of the plurality of interest points, the regions having shapes chosen so that their mean pixel values are independent of rotational alignment to said first image fragment, and 2) including within the plurality of selected alignments for each interest point only alignments for which mean pixel values of regions of the second image fragment aligning with the interest point have substantially similar mean pixel values to said mean pixel value of said region surrounding the interest point.

18. In a digital image alignment system, a method for aligning more than two image fragments to assemble a complete image, the method comprising the steps of:

receiving a list of overlapping image fragment pairs, each overlapping image fragment pair having an overlap alignment and being associated with an alignment measure based on the overlap alignment, the list of overlapping fragment pairs being associated with a total alignment measure, the total alignment measure being a sum of alignment error measures for each of the overlapping fragment pairs;

selecting an overlapping fragment pair from the list of overlapping fragment pairs;

adjusting the selected overlapping image fragment pair to arrive at an improved alignment for the selected overlapping image fragment pair;

calculating the total alignment measure for all pairs of overlapping image fragments based on the improved alignment for the selected overlapping image fragment pair;

selectively applying the improved alignment to the selected overlapping image fragment pair; and repeatedly applying the selecting step, the adjusting step, the calculating step, the determining step, and the applying step to successive overlapping fragment pairs to improve the total alignment measure.

19. The method of claim 18, further comprising receiving a user-defined alignment for the more than two image fragments, wherein the list of overlapping image fragment pairs is determined from the user-defined alignment.

20. The method of claim 18, further comprising sorting the list of overlapping image fragment pairs.

21. The method of claim 20, wherein the sorting is in an order of size of the overlap alignment of the overlapping image fragment pairs.

22. The method of claim 18, further comprising determining an alignment measure for the selected overlapping image fragment pair.

23. The method of claim 20, further comprising accumulating the determined alignment measure to arrive at the total alignment measure.

24. The method of claim 18, further comprising forming the complete image with the more than two image fragments based on an alignment determined from the repeatedly applying step.

25. The method of claim 18, wherein the alignment measure is determined from at least one of a cross-correlation metric and L1 norm.

26. The method of claim 18, wherein the adjusting step comprises identifying a plurality of interest points in an overlapping area within a first image fragment of the selected overlapping image fragment pair to match to a region of a second image fragment of the selected overlapping image fragment pair.

27. The method of claim 26, wherein the adjusting step comprises applying a variance operator to pixels of the overlapping area within the first image fragment.

28. The method of claim 26, wherein the adjusting step comprises: 1) overlaying a grid of cells over the overlapping area within the first image fragment, 2) applying a variance operator for each pixel in said overlapping area within the first image fragment to identify pixels for which an interest level exceeds a predetermined threshold, 3) selecting as potential interest points pixels having a greatest interest level in each said cell that includes a pixel for which said interest level exceeds a predetermined threshold, 4) selecting as a first interest point, one of said potential interest points having the greatest interest level, and 5) selecting as a second interest point, one of said potential interest points furthest away from said first interest point.

29. The method of claim 26, wherein the adjusting step comprises, for each of the plurality of interest points, measuring an alignment error of a plurality of possible alignments of regions of the second image fragment to a region surrounding the interest point in accordance with a second predetermined metric.

30. The method of claim 29, wherein the adjusting step comprises measuring an alignment error of each possible alignment on a pixel-by-pixel basis and further comprises:

terminating measurement of a particular alignment when an alignment error exceeds a threshold.

31. The method of claim 29, wherein the adjusting step further comprises, for each interest point, selecting as a group of candidate translational matches, ones of the plurality of possible alignments having a lowest measured alignment error, to obtain a group of candidate translational matches for each interest point.

32. The method of claim 31, wherein the adjusting step further comprises:

comparing candidate translational matches between said groups to select one or more sets of candidate translational matches, each set containing a candidate translational match from each group, each of said one or more sets having geometric relationships therebetween substantially similar to the geometric relationships between said plurality of interest points.

33. The method of claim 30, wherein the adjusting step further comprises:

if more than one set of candidate translational matches is selected, converting a set of centroids of pixels belonging to the more than one set of candidate translational matches to a refined alignment, and if only one set of candidate translational matches exists, converting the one set of candidate translational matches to the refined alignment.

34. The method of claim 29, wherein the adjusting step further comprises:

1) obtaining mean pixel values for regions of the first image fragment surrounding each of the plurality of interest points, the regions having shapes chosen so that their mean pixel values are independent of rotational alignment to said first image fragment, and 2) including within the plurality of selected alignments for each interest point only alignments for which mean pixel values of regions of the second image fragment aligning with the interest point have substantially similar mean pixel values to said mean pixel value of said region surrounding the interest point.

\* \* \* \* \*